United States Patent [19]

Furukawa et al.

[11] Patent Number: 5,150,252

[45] Date of Patent: Sep. 22, 1992

[54] HARMONICS GENERATION ELEMENT

[75] Inventors: Yasunori Furukawa, Kumagaya; Masayoshi Sato, Fukaya, both of Japan

[73] Assignee: Hitachi Metals, Ltd., Tokyo, Japan

[21] Appl. No.: 841,789

[22] Filed: Mar. 2, 1992

Related U.S. Application Data

[63] Continuation of Ser. No. 486,872, Mar. 1, 1990, abandoned.

[30] Foreign Application Priority Data

Apr. 4, 1989 [JP] Japan .................. 1-084963

[51] Int. Cl.$^5$ .................. G02F 1/03; G02F 1/07; H03F 7/04
[52] U.S. Cl. .................. 359/252; 359/264; 359/328; 372/22
[58] Field of Search .............. 350/354, 96.12; 372/22; 307/427

[56] References Cited

U.S. PATENT DOCUMENTS

| | | | |
|---|---|---|---|
| 3,262,058 | 7/1966 | Ballman et al. | 359/252 |
| 3,665,205 | 5/1972 | Bridenbaugh et al. | 307/425 |
| 3,700,912 | 10/1972 | Glass et al. | 350/356 |
| 4,048,515 | 9/1977 | Liu | 372/22 |
| 4,946,240 | 8/1990 | Yamamoto et al. | 350/96.12 |
| 4,953,931 | 9/1990 | Miyazaki et al. | 350/96.12 |

FOREIGN PATENT DOCUMENTS 2758876 7/1979 Fed. Rep. of Germany .
568789 11/1975 Switzerland .

OTHER PUBLICATIONS

"LiNbO$_3$-Waveguide Element for Second Harmonic Generation in Laser with 25% Conversion Efficiency," Nikkei Electronics No. 399, Jul. 14, 1986, pp. 89-90.

D. A. Bryan et al., "Increased optical damage resistance in lithium niobate," Apl. Phys. Lett. 44(9), May 1, 1984, pp. 847-849.

T. Taniuchi et al., "Second harmonic generation with GaAs laser diode in proton-exchanged LiNbO$_3$ waveguides," 174.ECOC 1986.

Bridenbaugh et al., "Spatially Uniform and Alterable SHG Phase-Matching Temperatures in Lithium Niobate," Applied Physics Letters, vol. 17, No. 3, Aug. 1, 1970, pp. 104-106.

Bryan et al., "Magnesium-doped lithium niobate for higher optical power applications," Optical Engineering, vol. 24, No. 1, Jan.-Feb. 1985, pp. 138-143.

Primary Examiner—Rolf Mille
Assistant Examiner—Robert Limanek
Attorney, Agent, or Firm—Finnegan, Henderson, Farabow, Garrett & Dunner

[57] ABSTRACT

A harmonics generation element which comprises a nonlinear optical element having single-crystals of lithium niobate containing magnesium of less than 5 atomic per cent. The nonlinear optical element has 3 ppm or less of impurity Fe and is configured so that a primary laser beam is made incident into the nonlinear optical element and a secondary output light having a wavelength of higher-order harmonics is emitted therefrom.

7 Claims, 4 Drawing Sheets

HARMONICS GENERATION ELEMENT

This application is a continuation of application Ser. No. 07/486.872 filed Mar. 1, 1990, now abandoned.

BACKGROUND OF THE INVENTION

The present invention relates to an improvement of a harmonics generation element for use, as a light source of short wave length or the like, in the field of optical recording or the like. In particular, the present invention relates to a harmonics generation element improved as to the properties of single-crystals of lithium niobate to be used in such a harmonics generation element.

Higher speed as well as higher density are demanded for information processing, such as information transmission, information recording, information reproduction, and the like, in the field of information processing techniques. Optical techniques, such as optical recording and the like, have begun to be used in an attempt to satisfy the demand. It can be presumed that the tendency to increase the speed and density will be more accelerated in the future. To this end, it is thought that required is a light source which has a shorter wavelength (for example, in the range of from about 400 nm to about 700 nm), which has output power in the range of from the order of mW to the order of tens of mW in practical use, and which has a high response.

For such a light source, two techniques have been investigated. One is a laser diode using a Group III - Group V or Group II - Group IV compound semiconductor. The other is a harmonics converter such as a secondary harmonics generator, a tertiary harmonics generator, or the like. The former is now under research and the most favorable results thus far are a laser diode having a wavelength of 700 nm. Accordingly, long-term research will be required for development of a practical laser diode in the point of view of output beam power as well as shortening of the wavelength. length. It is thought that the wavelength of a light source using such a semiconductor laser may be limited to 400 nm. On the other hand, SHG (second harmonic generation) elements using crystals of lithium niobate (for example, as described in an article, "LiNbO$_3$—Waveguide Element for Second Harmonic Generation in Laser with 25% Conversion Efficiency", NIKKEI ELECTRONICS No. 399, issued Jul. 14, 1986, pages 89 to 90) are known as one of the latter technique. In recent years, the SHG elements have been available in the market so as to be put into practice.

However, a problem in the field of optical applied techniques using such an SHG element is in that the SHG conversion efficiency of materials used for the SHG element is low. Although the conversion efficiency varies according to the incident beam power, the present situation is that the conversion efficiency is only 1 or 2 percent in the case where a waveguide type element using crystals of lithium niobate is used.

In the field of optical communication using long wavelength light sources having a wavelength of 1.3 μm or 1.55 μm, for example, in the case where crystals of lithium niobate are used in optical modulators and the like, occurrence of optical damage becomes no practically serious problem if the energy strength of the light sources is not greater than about 10 mW. On the other hand, in the case where short wavelength light is used for the purposes of optical recording and the like, occurrence of optical damage becomes a serious problem even though the energy strength of the light sources is about 0.1 mW. Therefore, various proposals have been made. One of the proposals is a method of reducing optical damage through addition of magnesium (as reported in a paper by D. A. Bryan et al., "Increased Optical damage resistance in lithium niobate", Appl. Phys. Lett., vol. 44, No. 9, page 847, 1984).

According to the Bryan et al. report, it is known that optical damage resistance in crystals of lithium niobate increases as the magnesium content of the crystals increases, and that the optical damage resistance takes a constant value after the magnesium content reaches 5 atomic percent. Accordingly, in the case where crystals of magnesium-containing lithium niobate are used in optical elements sensitive to optical damage, it is common knowledge that the magnesium content is made to be not less than 5 atomic percent (or 5 mol percent as MgO).

In general, optical damage becomes more pronounced as the wavelength related to the optical damage becomes shorter. Accordingly, it is predicted that optical damage will become a more serious problem in materials for harmonic conversion elements used for light of a wavelength shorter than the 1.55 μm wavelength light currently used in optical communication and the like.

As described above, single-crystals of lithium niobate have begun to be put into practice as a material for harmonics generation elements. However, there is the problem of low conversion efficiency. In addition, it is established that reduction of optical damage is required in practical use.

SUMMARY OF THE INVENTION

Therefore, an object of the present invention is to provide a harmonics generation element using single-crystals of lithium niobate having sufficient optical damage resistance for practical use as well as high conversion efficiency.

Another object of the present invention is to provide a harmonics generation element in which SHG conversion efficiency in bulk crystals by application of certain incident beam power at a room temperature is increased by 500 times through 1000 times compared with that in conventional bulk crystals.

A further object of the present invention is to provide a waveguide type SHG element having high conversion efficiency increased by about 100 times the conversion efficiency of the bulk crystals.

To attain the foregoing objects, according to the present invention, in the harmonics generation element in which a primary laser beam is made incident into nonlinear optical crystals to generate a nonlinear phenomenon in the optical crystals to thereby produce a higher-order harmonics beam, such as a beam (secondary harmonics) having a wavelength half the wavelength of the primary laser beam (fundamental wave), as a secondary output beam, single-crystals of lithium niobate containing magnesium of less than 5 atomic percent are used as the nonlinear optical crystals.

The intensity of the harmonics output of an SHG element increases as the interaction between a fundamental wave and a harmonics wave becomes more intensive. On the other hand, there is a tendency that optical damage becomes more remarkable as the wavelength of transmission light becomes shorter. Accordingly, optical damage due to a harmonics wave occurs relatively easily compared with that in a fundamental wave. Light passing through such a damage area is attenuated. Consequently, SHG output power is lowered with the occurrence of such optical damage.

In the case where single-crystals of lithium niobate containing magnesium is used in an optical element sensitive to optical damage as described above, it is conventionally common knowledge to make the magnesium content be not less than 5 atomic percent.

However, the inventors have made various experiments and investigations while paying attention to the fact that production of particle boundaries and lowering of light permeability in the vicinity of absorption ends can occur in grown crystals as the magnesium content increases, and, accordingly, usefulness of the crystals for optical use is unacceptably reduced. As a result, the inventors have found that optical damage resistance in single-crystals of lithium niobate used in SHG elements can be improved by addition of magnesium to the crystals as in the conventional common sense but SHG elements having good properties cannot be always obtained if the magnesium content is too much.

Therefore, the inventors have attained the present invention through experiments in which single-crystals of lithium niobate having various magnesium contents of from a small amount to an amount of more than 5 atomic percent and having different impurity Fe contents are grown, SHG characteristics of the crystals are investigated, and properties of single-crystals of lithium niobate optimum for SHG are obtained. The range of application of the element according to the invention is considered to be wide, for example, in the fields of laser printer light sources, optical pickup light sources, and the like.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Figure 1:
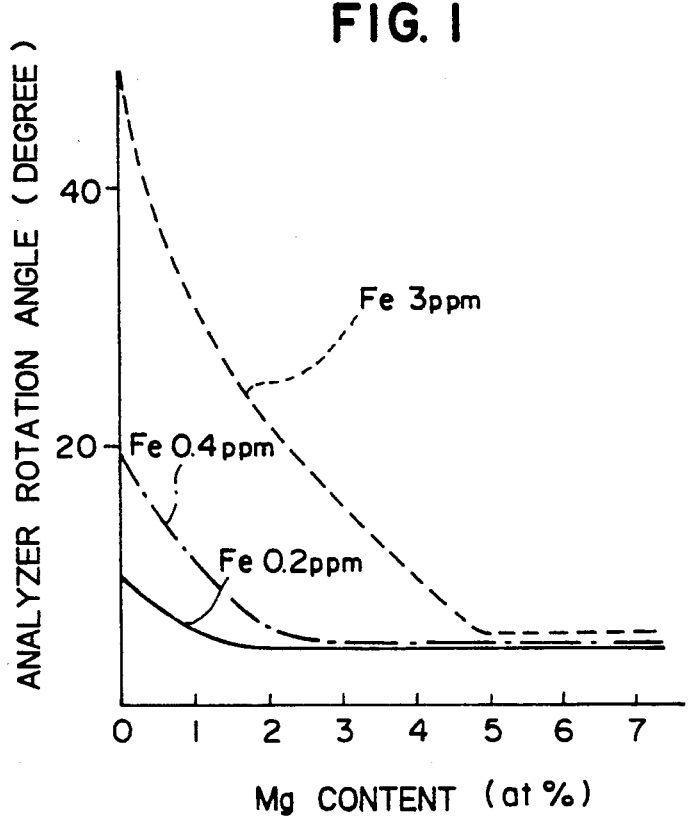
FIG. 1 is a graph showing the relationship between magnesium content and optical damage.

FIG. 1 is a graph showing the relationship between magnesium content and optical damage, in which the optical damage is estimated by the rotational angle of an analyzer. In the past, it has been generally thought that the effect of improving optical damage resistance corresponding to the magnesium content can be attained when the magnesium content is larger than 5 atomic percent. However, the inventors have found that the aforementioned fact is true only in the case where the amount of impurity Fe is considerably large and that the effect of improving optical damage resistance corresponding to the magnesium content has a close relationship to the amount of impurity Fe. In short, it has been found that the sufficient effect of improving optical damage resistance is attained even in the case where the magnesium content is considerably small if the amount of impurity Fe can be reduced. As shown in FIG. 1, it is apparent that sufficient optical damage resistance for practical use can be attained even in the case where the magnesium content is smaller than 5 atomic percent if the amount of impurity Fe is not more than 0.4 ppm.

Figure 2:
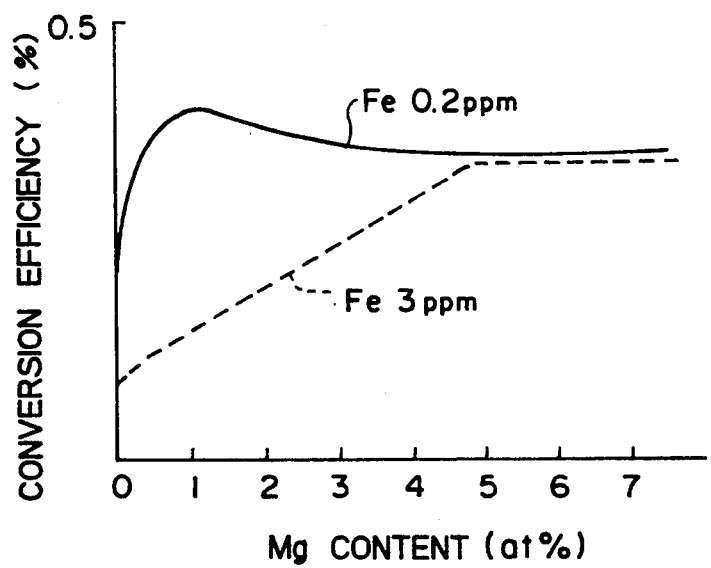
FIG. 2 is a graph showing the relationship between magnesium content and conversion efficiency.

FIG. 2 is a graph showing the relationship between magnesium content and conversion efficiency. Although it can be supposed that the amount of impurity Fe has a close relationship to the optical damage resistance, conversion efficiency increases as the magnesium content increases in the case where the amount of impurity Fe is relatively large. Though not shown, the conversion efficiency decreases when the magnesium content is larger than 10 atomic percent. The cause of the decrease of the conversion efficiency cannot be clarified but the cause may be deterioration of quality of crystals. On the contrary, in the case where the amount of impurity Fe is small so as to be 0.2 ppm, the best conversion efficiency is attained when the magnesium content is from about 1 to about 2 percent. In short, the magnesium content to attain the best conversion efficiency decreases as the amount of impurity Fe decreases. It is considered from the above description that the preferable range of the magnesium content is less than 3 atomic percent.

Figure 3:
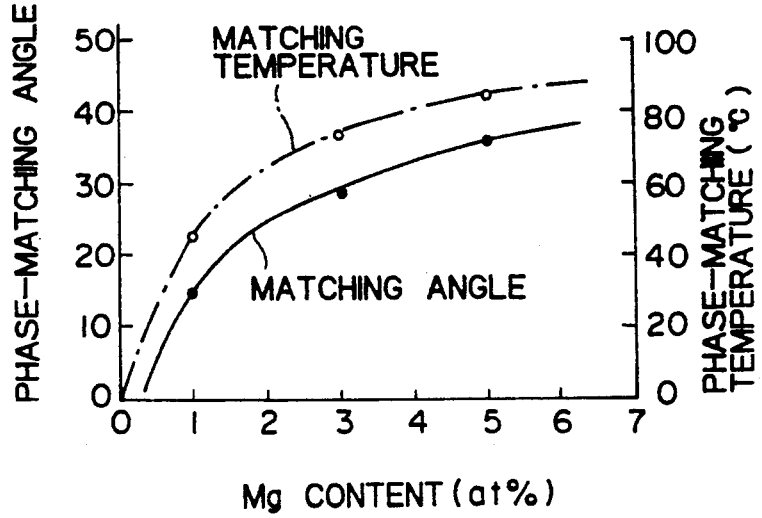
FIG. 3 is a graph showing the relationships between magnesium content and phase-matching angle and between magnesium content and phase-matching temperature.

FIG. 3 is a graph showing the relationships between magnesium content and phase-matching angle and between magnesium content and phase-matching temperature, in the case where the amount of impurity Fe is 0.2 ppm. As is apparent from this graph, the region in which the magnesium content is less than 0.5 atomic percent is a region in which phase-matching angle or phase-matching temperature changes suddenly. It is, therefore, apparent that the magnesium content of not less than 0.5 atomic percent is preferable for the purpose of producing a harmonics generation element having stable properties. In general, the range of temperature in use of the harmonics generation element is considered to be from about 10 to about 60° C. Further, it is preferable to select the phase-matching angle to be as small as possible due to consideration of the yield of the crystals. When the phase-matching angle is assumed to be not more than 20°, it is to be understood that the more preferable range of the magnesium content is from 0.5 to 2 percent.

Although this embodiment has shown the case where magnesium is used as an additive for the purpose of improvement of optical damage resistance, it is to be understood that the invention is not limited to the specific embodiment and that any suitable matter can be used as an additive if the matter can give suitable concentration and level for formation of such an acceptor level that electrons of about $10^{15}$ cm$^{-3}$ can be detected in a transmission band by beam radiation. Examples of such other additives are calcium, boron and the like.

Figure 4:
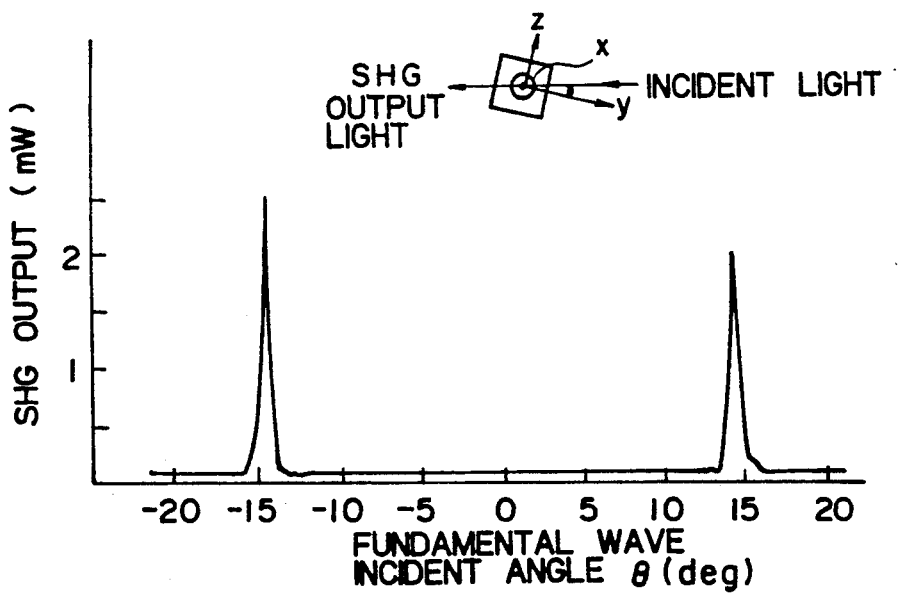
FIG. 4 is an SHG output beam characteristic graph of crystals of lithium niobate containing 1 atomic percent of magnesium according to the present invention.

As shown in FIG. 4, crystals containing magnesium as an additive were cut into $10 \times 10 \times 10$ mm$^3$ regularcubic blocks having edges parallel to x-, y- and z-directions respectively. Then, two y-planes of each of the blocks were subjected to mirror polishing to thereby prepare bulk samples. The SHG output power in each of the bulk samples was measured by making a 1.06 μm-wavelength YAG laser beam incident an one y-plane while rotating crystals about the x-axis. In the graph of SHG output beam intensity measured in a sample containing 1 atomic percent of magnesium as shown in FIG. 4, the ordinate represents SHG output beam power and the abscissa represents an angle between the y-axis and the incident light. In the measurement, SHG output beam power of about 2 mW was obtained in angular positions of +15° and −15° when the incident YAG beam power was 4.5 kW.

Figure 5:
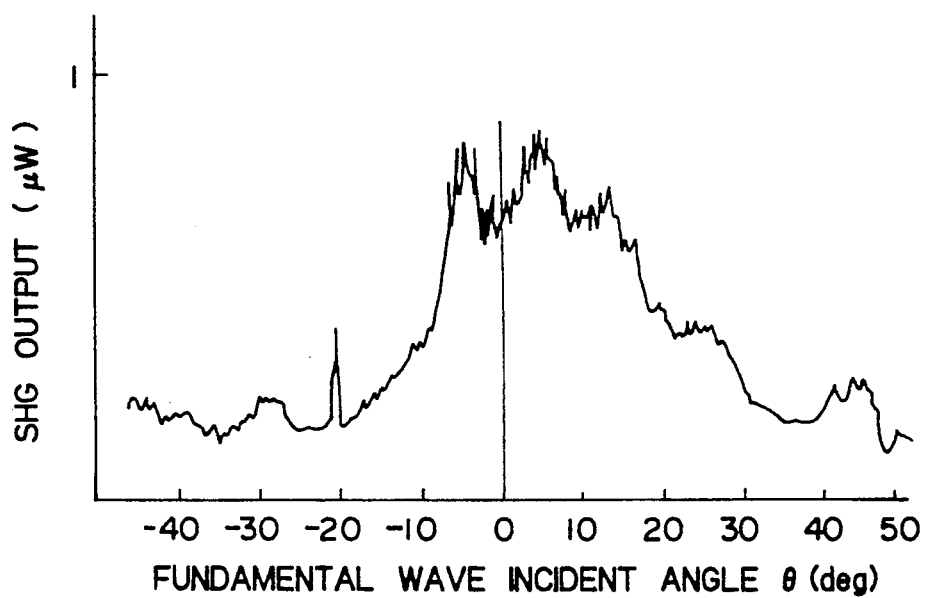
FIG. 5 is an SHG output beam characteristic graph of optical crystals of lithium niobate containing no magnesium.
Figure 6:
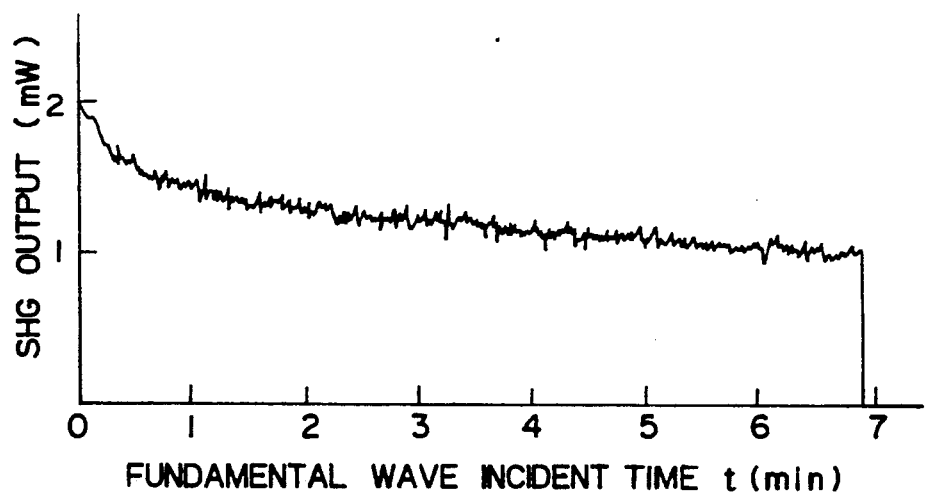
FIG. 6 is a graph showing the change of the intensity of SHG output beams with the passage of time in the crystals of lithium niobate containing 1 atomic percent of magnesium according to the invention.

FIG. 5 shows an example of the SHG output beam characteristic in optical single-crystals of lithium niobate containing no magnesium and containing 0.4 ppm of impurity Fe. In FIG. 5, the characteristic was measured in the same manner as described above. Weak SHG output beam power of 1 μW or less, which is so called "maker's fringe", was observed in the range between −20° and +30°. In short, the output beam power at room temperature is considered to be reduced because of phase mismatching or optical damage. FIG. 6 shows an example in which SHG output beam power was measured while a YAG laser beam was made incident continuously. As shown in FIG. 6, the SHG output beam power of the sample containing 1 atomic percent of magnesium changes with the passage of time. The output power decreases with the passage of beam radiation time. After about 7 minutes, the output power becomes constant. The stabilized output beam power is about 1 mW. In short, very large output beam power can be obtained in the sample containing magnesium, compared with the sample containing no magnesium. The change of output beam power with the passage of time may be caused by occurrence of optical damage or may be caused by the change of the phase-matching condition due to rising of the sample temperature. To investigate the cause of the power change, a measurement was further made while the incident beam intensity was increased to $10^4$ kW/cm$^2$. As a result, it was confirmed that optical damage did not occur when the non-continuous incident beam power and the output power were respectively less than 138 kW/cm$^2$ and 1.1 kW/cm$^2$. Accordingly, it is concluded that the power change with the passage of time is caused by the rising of the sample temperature.

As is obvious from FIGS. 4 and 5, the conversion efficiency at room temperature in the sample containing magnesium according to one embodiment of the invention can be increased by 500 times through 1000 times, compared with that in the conventional sample containing no magnesium. Because this conversion efficiency is the SHG conversion efficiency in bulk crystals, and because the conversion efficiency in the waveguide type SHG element formed from the bulk crystals is generally considered to be increased by about 100 times the conversion efficiency in the bulk crystals, alone it is obvious that an SHG element having very high efficiency can be realized. Furthermore, it is a feature of this invention that the conversion efficiency can be obtained even in the case where the magnesium content is less than 5 atomic percent which is conventionally considered to be the minimum amount necessary for prevention of optical damage, for example, in the case of the present invention where the magnesium content is 1 atomic percent.

Another embodiment according to the present invention will be described hereunder.

Figure 7:
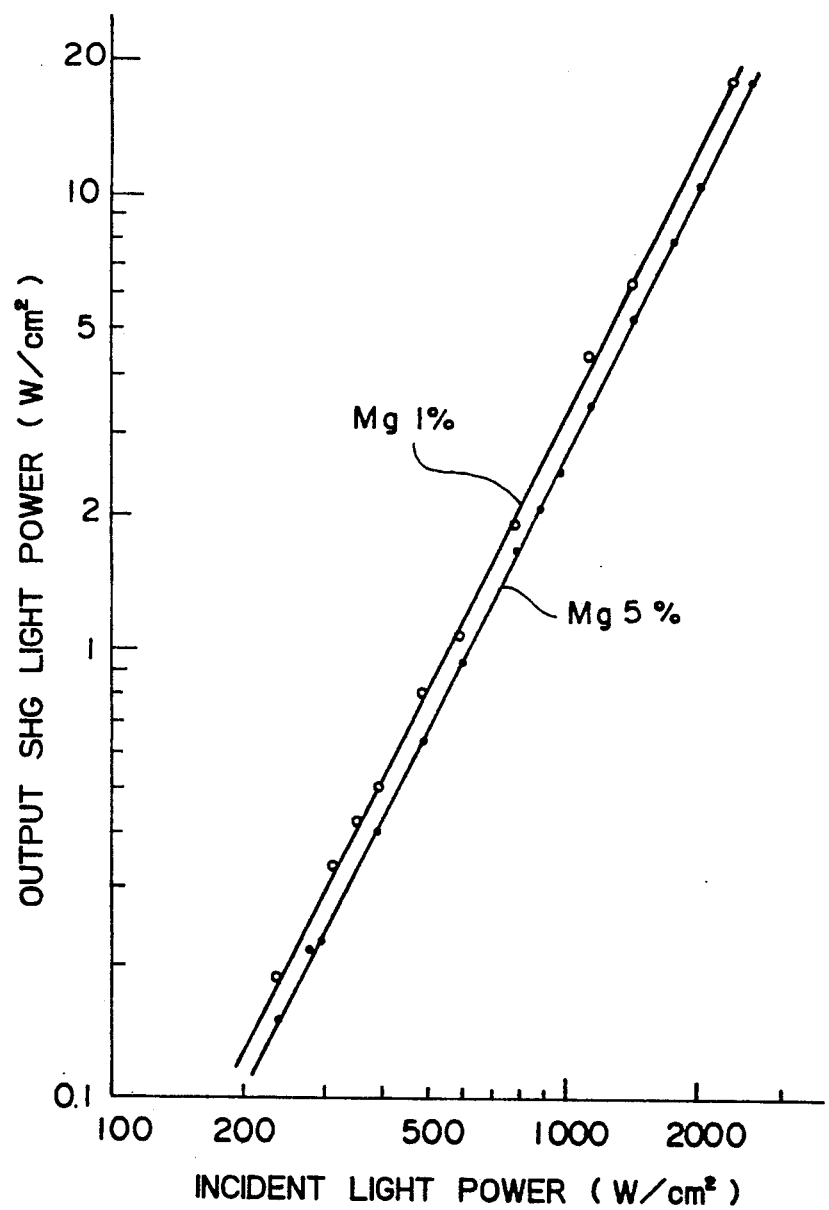
FIG. 7 is a characteristic graph showing the relationship between incident powder and SHG output power.

The SHG output power was measured while the input power of the YAG laser was changed. The size of the measurement samples was the same as in Embodiment 1. The result of the measurement is shown in FIG. 7. In all the samples, the output power is in proportion to the square of the input power. Accordingly, it is obvious that there is no occurrence of optical damage. Further, it is apparent from the drawing that the sample containing 1 atomic percent of magnesium can obtain a larger output power compared with that of the sample containing 5 atomic percent of magnesium, for the same input power.

According to the present invention, the effect obtained by addition of magnesium can be observed even in the case where the magnesium concentration is considerably small. Accordingly, the magnesium concentration in the invention is not limited specifically. In practice, it is preferable that 0.1 atomic percent or more of magnesium is added to make it possible to detect the effect obtained by addition of magnesium.

We claim:

1. A harmonics generation element comprising an optical waveguide for operation in the range of about 10°–60° C. in which a primary laser beam is made incident into nonlinear optical crystals so that a higher-order harmonics beam with said wavelength of the primary laser beam as a fundamental wave is produced as a secondary output light, said harmonics generation element comprising single-crystals of lithium niobate as said nonlinear optical crystals, single crystals containing magnesium of between 1 and 5 atomic percent and an impurity Fe content of 0.4 ppm or less.

2. A harmonics generation element comprising an optical waveguide for operation in the range of about 10°14 60° C. in which a primary laser beam is made incident into nonlinear optical crystals so that a higher-order harmonics beam with said wavelength of the primary laser beam as a fundamental wave is produced as a secondary output light, said harmonics generation element comprising single-crystals of lithium niobate as said nonlinear optical crystals, said single-crystals containing magnesium of between 1 and 5 atomic percent and an impurity Fe content of 3 ppm or less.

3. A harmonics general element comprising an optical waveguide for operation in the range of 10°–60° C. in which a primary beam is made incident into nonlinear optical crystals so that a higher-order harmonics beam with said wavelength of the primary laser beam as a fundamental wave is produced as a secondary output light, said harmonics generation element comprising single-crystal of lithium niobate as said nonlinear optical crystals, said single crystals exhibiting a phase-matching angle of 20° or less from the Y-axis at a room temperature and having a magnesium content of between 1-2 atomic percent, and an impurity Fe content of less than about 0.4 ppm.

4. Optical single-crystals of lithium niobate containing a magnesium content of between 1 and 5 atomic percent and an impurity Fe content of 3 ppm or less.

5. Optical single crystals of lithium niobate according to claim 4, in which the magnesium content is between about 1-2 atomic percent.

6. The optical single crystals of lithium niobate according to claim 4 in which the magnesium content is between about 1-2 atomic percent and the impurity of Fe is about 0.2 ppm or less.

7. The harmonics generation element of claim 1 having a magnesium content between about 1-2 atomic percent and an Fe impurity of about 0.2 ppm or less.

* * * * *

UNITED STATES PATENT AND TRADEMARK OFFICE
CERTIFICATE OF CORRECTION

PATENT NO. : 5,150,252  
DATED : September 22, 1992  
INVENTOR(S) : Yasunori Furukawa et al.

It is certified that error appears in the above-identified patent and that said Letters Patent is hereby corrected as shown below:

Claim 2, column 6, line 35, "10°1460°" should be --10°-60°--;

Claim 3, column 6, line 50, "single-crystal" should be --single-crystals--.

Signed and Sealed this

Twenty-eighth Day of September, 1993

*Attest:*

BRUCE LEHMAN

*Attesting Officer*   *Commissioner of Patents and Trademarks*